(12) United States Patent
Ikeya et al.

(10) Patent No.: US 11,739,840 B2
(45) Date of Patent: Aug. 29, 2023

(54) PISTON RING

(71) Applicant: NIPPON PISTON RING CO., LTD., Saitama (JP)

(72) Inventors: Kyoichi Ikeya, Saitama (JP); Ofuyu Sakai, Saitama (JP); Makoto Kajiwara, Saitama (JP)

(73) Assignee: NIPPON PISTON RING CO., LTD., Saitama (JP)

( * ) Notice: Subject to any disclaimer, the term of this patent is extended or adjusted under 35 U.S.C. 154(b) by 181 days.

(21) Appl. No.: 17/291,464

(22) PCT Filed: Oct. 31, 2019

(86) PCT No.: PCT/JP2019/042728
§ 371 (c)(1),
(2) Date: May 5, 2021

(87) PCT Pub. No.: WO2020/095807
PCT Pub. Date: May 14, 2020

(65) Prior Publication Data
US 2022/0003316 A1 Jan. 6, 2022

(30) Foreign Application Priority Data
Nov. 6, 2018 (JP) .................................. 2018-209207

(51) Int. Cl.
*F16J 15/20* (2006.01)
*F16J 9/20* (2006.01)
*F16J 9/26* (2006.01)

(52) U.S. Cl.
CPC ................ *F16J 9/203* (2013.01); *F16J 9/26* (2013.01)

(58) Field of Classification Search
CPC ...... F16J 9/12; F16J 9/203; F16J 9/206; F16J 9/26
See application file for complete search history.

(56) References Cited

U.S. PATENT DOCUMENTS 2,940,803 A * 6/1960 Phillips .................... F16J 9/20
277/444
2002/0033579 A1 3/2002 Ishida
(Continued)

FOREIGN PATENT DOCUMENTS

JP 7-27228 A 1/1995
JP 7-42417 U 8/1995
(Continued)

OTHER PUBLICATIONS

International Search Report dated Jan. 7, 2020, issued by the International Searching Authority in application No. PCT/JP2019/042728.
(Continued)

*Primary Examiner* — Gilbert Y Lee
(74) *Attorney, Agent, or Firm* — Sughrue Mion, PLLC

(57) ABSTRACT

To provide a piston ring for an internal combustion engine, particularly a second compression ring, which has excellent wear resistance and can achieve both lower fuel consumption and efficient combustion. The above-described problem is solved by a piston ring (1) for an internal combustion engine formed so as to have a tapered shape by a peripheral surface (14) that gradually projects outward from a top to a bottom, and a radial cross-sectional shape of a Napier ring. The peripheral surface (14) is constituted by an outer edge end portion (14b) that has a non-tapered shape and comes into sliding contact, as a peripheral sliding surface, with a mating material, an outer peripheral tapered part (14a) formed at a predetermined taper angle (α) above the outer edge end portion (14b), a curved surface part (14c) having a diameter that gradually decreases inward from the outer edge end portion (14b) to a lower end in an axial direction, and a lower end portion (14d) forming a section of the curved surface part (14c). A distance (d2) between a position (A) of the outer edge end portion (14b) and a position (C) of the lower end portion (14d) in a ring axial direction is within a range of 0.001 mm to 0.05 mm, and a contact width (d1)

(Continued)

of the outer edge end portion (14b) in the ring axial direction is within a range of 0.01 mm to 0.3 mm.

5 Claims, 3 Drawing Sheets

(56) References Cited

U.S. PATENT DOCUMENTS

| 2013/0154196 | A1  | 6/2013  | Sytsma et al. |           |
|--------------|-----|---------|---------------|-----------|
| 2013/0328274 | A1* | 12/2013 | Sugiura       | F16J 9/26 |
|              |     |         |               | 277/444   |
| 2015/0198249 | A1  | 7/2015  | Watanabe      |           |
| 2016/0003356 | A1  | 1/2016  | Ozaki et al.  |           |
| 2017/0009885 | A1* | 1/2017  | Pegg          | F16J 9/20 |
| 2017/0009887 | A1* | 1/2017  | Pegg          | F16J 9/12 |
| 2018/0017159 | A1  | 1/2018  | Fujita        |           |
| 2019/0048010 | A1  | 2/2019  | Fujita        |           |

FOREIGN PATENT DOCUMENTS

| JP | 2002-323133 A  | 1/2002 |
| JP | 2014-35038 A   | 2/2014 |
| JP | 2016-138629 A  | 8/2016 |
| WO | 2014/133095 A1 | 9/2014 |
| WO | 2017/146048 A1 | 8/2017 |

OTHER PUBLICATIONS

Written Opinion dated Jan. 7, 2020, issued by the International Searching Authority in application No. PCT/JP2019/042728.

* cited by examiner

PISTON RING

CROSS REFERENCE TO RELATED APPLICATIONS

This application is a National Stage of International Application No. PCT/JP2019/042728 filed Oct. 31, 2019, claiming priority based on Japanese Patent Application No. 2018-209207 filed Nov. 6, 2018.

FIELD OF THE INVENTION

The present invention relates to a piston ring for an internal combustion engine, and more specifically, a piston ring used as a second compression ring for an internal combustion engine.

BACKGROUND ART

In recent years, environmental problems such as warming have been greatly highlighted on a global scale. With the demand for a reduction in $CO_2$ emissions into the atmosphere, lower fuel consumption is required in engines as well. Further, with the demand for lower fuel consumption, a reduction in frictional force during sliding with cylinder liners is required in piston rings. Furthermore, with the development of higher engine output, the quality required for the piston ring has increased, and sliding characteristics therefor (for example, wear resistance, scuffing resistance, and the like) are required. Against this background, advancements have been made in the development of piston rings having excellent wear resistance and seizure resistance and capable of maximizing the effect of reducing frictional force, the development of surface treatment technology for such piston rings, the development of surface modification technology, and the like.

Generally, a piston for an internal combustion engine is equipped with three piston rings, namely a first compression ring and a second compression ring serving as compression rings and an oil ring. A steel material equivalent to SUS440 (JIS standard), which is a martensitic stainless steel, or the like is used in the first compression ring exposed to a harsh environment. In contrast, a stainless steel material containing about 9 to 14 mass % of Cr is used in the second compression ring having a small thermal load and pressure load. Then, in order to obtain a piston ring that exhibits favorable sliding characteristics, even if the thermal load or the pressure load increases as output increases as described above, it is common to perform nitriding treatment on a piston ring base material.

Nevertheless, when at least a peripheral sliding surface of the piston ring base material is subjected to the nitriding treatment, there is a problem in that a dimensional accuracy of the piston ring base material lowers and machining after the nitriding treatment is very difficult. Further, when a nitriding treatment process is performed, there is a drawback in that there are many machining processes and the cost is also high.

In response to these problems, for example, in Patent Document 1, there is proposed a piston ring made of carbon steel material containing C: 0.50 to 0.75 mass %, Si: 0.15 to 0.35 mass %, Mn: 0.61 to 0.95 mass %, P: 0.03 mass % or less, S: 0.03 mass % or less, and a remnant being Fe and inevitable impurities. In Patent Document 1, the applicant proposes that at least a peripheral sliding surface of the second compression ring is subjected to nitriding treatment or hard chrome plating as an alternative to the nitriding treatment.

Further, in Patent Document 2, there is proposed a piston ring made of a carbon steel material containing Cr: 9.0 mass % to 11.0 mass %, inclusive, and C: 0.45 mass % to 0.55 mass %, inclusive, with a nitriding diffusion layer having a hardness of 700 HV (0.05) or greater formed at a depth of 2 µm to 25 µm, inclusive, on an upper surface, a lower surface, a peripheral surface, and an inside surface. The piston ring proposed in Patent Document 2 is made with the second compression ring in mind. Then, the piston ring base material is constituted by the carbon steel material having the above-described composition, thereby thinly forming a nitriding diffusion layer uniformly without irregularities and all around the ring while suppressing the generation of a white layer. In this way, grinding after nitriding becomes unnecessary, and the cost is significantly reduced.

Further, in Patent Document 3, there is provided a piston ring for an internal combustion engine, particularly a second compression ring, which has excellent wear resistance and can be formed at low cost. This piston ring is formed such that the peripheral surface shape is a tapered face, and a cross-sectional shape in the radial direction is a rectangular ring, a scraper ring, or a Napier ring, and includes a piston ring base material and a hard film provided on at least a peripheral sliding surface of the piston ring base material. The piston ring base material is made of a low alloy steel or a carbon steel material having a Vickers hardness of HV 350 to HV 550, inclusive. The peripheral sliding surface is formed into a tapered shape that gradually projects outward from an upper end to a lower end of the piston ring base material, and is formed so that a length in an axial direction is 0.01 mm to 0.30 mm, inclusive, between an outer edge end portion of the tapered peripheral sliding surface and an imaginary line tangent to a lower end surface or a lower end portion where a curved surface having a diameter that decreases gradually inward from the outer edge end portion to a lower end in an axial direction is parallel to a ring lower surface.

PRIOR ART DOCUMENTS

Patent Documents

Patent Document 1: Japanese Laid-Open Patent Application No. 2002-194500
Patent Document 2: Japanese Laid-Open Patent Application No. 2007-270880
Patent Document 3: International Publication WO2012/118036

SUMMARY OF THE INVENTION

Problems to be Solved by the Invention

The inventions proposed in Patent Document 1 and Patent Document 2 are excellent in that a piston ring for an internal combustion engine having wear resistance and high strength can be formed at low cost. In Patent Document 3, there is proposed a piston ring having excellent wear resistance and low cost without subjecting the piston ring base material to a nitriding treatment.

While lower fuel consumption in vehicles and the like is required, it is necessary to improve oil-scraping function and further decrease oil leakage into combustion parts in order to realize an efficient internal combustion phenomenon. Nevertheless, when a contact width of an oil ring outer edge end portion (also referred to as a contact surface) that comes into contact with a cylinder liner is large, a contact pressure decreases, which contributes to lower fuel consumption, but oil leakage is likely to occur and efficient combustion deteriorates. On the other hand, when the contact width of the outer edge end portion is small, the contact pressure increases and the contribution to lower fuel consumption decreases, but oil leakage is less likely to occur and efficient combustion is improved. It is desired that all of these can be resolved.

The present invention has been made to solve the above-described problems, and an object of the present invention is to provide a piston ring for an internal combustion engine, particularly a second compression ring, which has excellent wear resistance and can achieve both lower fuel consumption and a reduction in lubricating oil consumption.

Means for Solving the Problems

A piston ring according to the present invention is a piston ring for an internal combustion engine formed so as to have a tapered shape by a peripheral surface that gradually projects outward from a top to a bottom, and a radial cross-sectional shape of a Napier ring. The peripheral surface is constituted by an outer edge end portion that has a non-tapered shape and comes into sliding contact, as a peripheral sliding surface, with a mating material, an outer peripheral tapered part formed at a predetermined taper angle above the outer edge end portion, a curved surface part having a diameter that gradually decreases inward from the outer edge end portion to a lower end in an axial direction, and a lower end portion forming a section of the curved surface part. A distance d2 between a position of the outer edge end portion and a position of the lower end portion in a ring axial direction is within a range of 0.001 mm to 0.05 mm, and a contact width d1 of the outer edge end portion in the ring axial direction is within a range of 0.01 mm to 0.3 mm.

According to this invention, the distance d2 between the position of the outer edge end portion and the position of the lower end portion in the ring axial direction is within the above-described range, and the contact width d1 of the outer edge end portion in the ring axial direction is within the above-described range, making it possible to adjust a relationship between a contact pressure and an oil seal and achieve both lower fuel consumption and a reduction in lubricating oil consumption.

In the piston ring according to the present invention, d2/d3 is within a range of 0.20 to 1.20, where d3 is a distance between a position of the outer edge end portion and a position of the lower end portion in a ring radial direction.

In the piston ring according to the present invention, the distance d3 between the position of the outer edge end portion and the position of the lower end portion in the ring radial direction is within a range of 0.010 mm to 0.050 mm.

In the piston ring according to the present invention, at least the peripheral surface includes a hard treatment layer. While it is preferable to perform such various treatments on the peripheral surface, it is not necessary to perform these treatments as long as the peripheral surface has the above-described peripheral surface shape.

In the piston ring according to the present invention, the hard treatment layer is a chromium nitride-based film, a chromium plating film, a hard carbon film, or a laminated film with a hard carbon film provided on a chromium nitride-based film.

Effect of the Invention

According to the present invention, it is possible to provide a piston ring for an internal combustion engine (particularly a second compression ring), which has excellent wear resistance and can achieve both lower fuel consumption and a reduction in lubricating oil consumption (LOC).

BRIEF DESCRIPTION OF THE DRAWINGS

FIG. 3B is a form example in which the hard treatment layer is provided in areas other than the peripheral surface as well.

EMBODIMENTS OF THE INVENTION

The following describes in detail a piston ring according to the present invention with reference to the drawings. It should be noted that the present invention is not limited to the descriptions and the drawings below as long as the descriptions and the drawings are included in the technical scope of the present invention.

[Piston Ring]

Figure 1A:
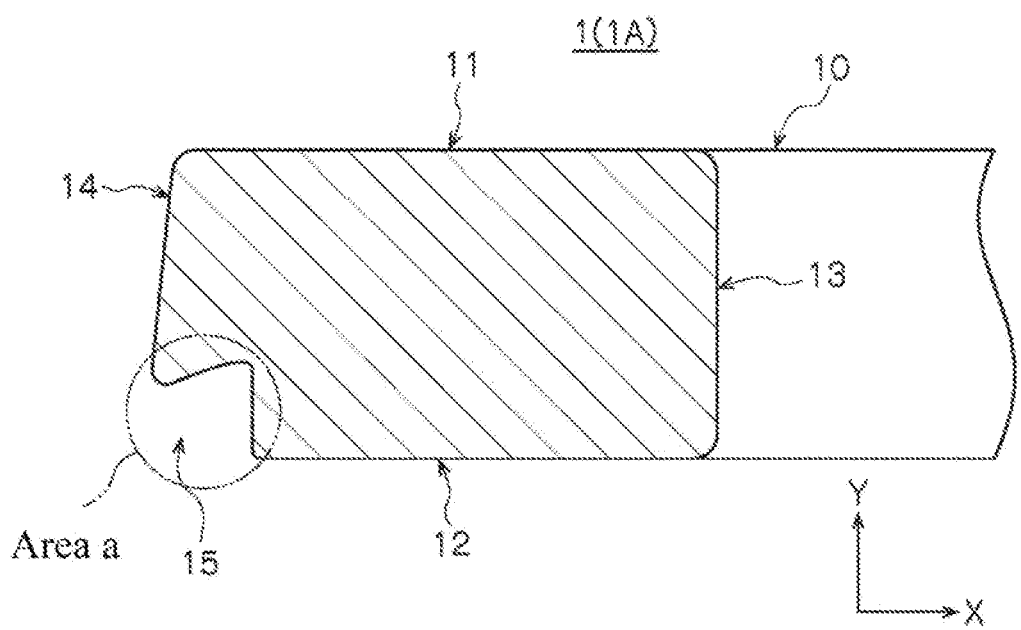
FIGS. 1A and 1B are schematic cross-sectional configuration views illustrating an example of a piston ring according to the present invention.
Figure 1B:
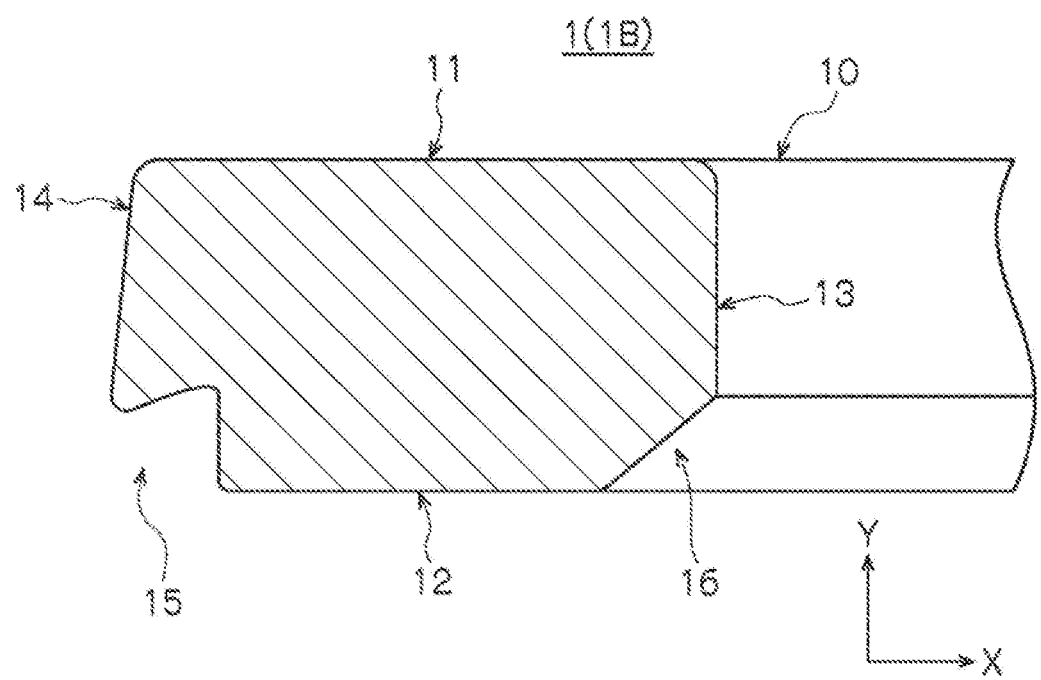
Figure 2:
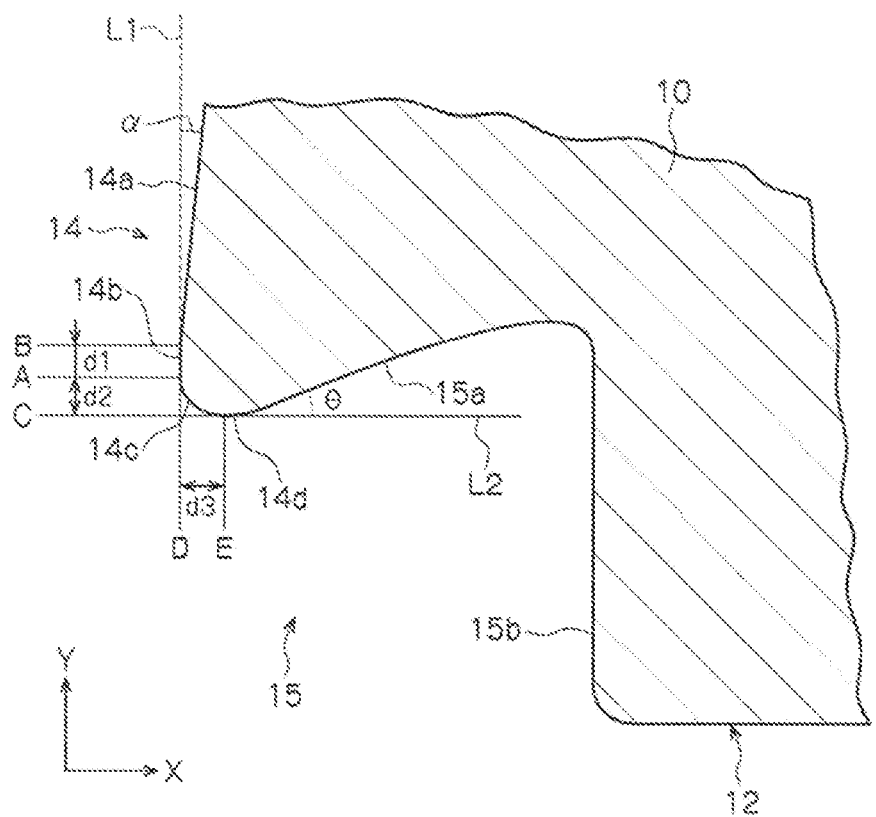
FIG. 2 is an enlarged cross-sectional view of an area a of the piston ring illustrated in FIGS. 1A and 1B.

A piston ring 1, as illustrated in FIGS. 1A and 1B and FIG. 2, is a piston ring for an internal combustion engine formed so as to have a tapered shape by a peripheral surface 14 that gradually projects outward from a top (side of an upper surface 11) to a bottom (side of a lower surface 12), and an axial cross-sectional shape of a Napier ring. Then, the peripheral surface 14 is constituted by an outer edge end portion 14b that has a non-tapered shape and comes into sliding contact, as a peripheral sliding surface, with a cylinder liner serving as a mating material, an outer peripheral tapered part 14a formed at a predetermined taper angle α above the outer edge end portion 14b, a curved surface part 14c having a diameter that gradually decreases inward from the outer edge end portion 14b to a lower end in an axial direction Y, and a lower end portion 14d forming a section of the curved surface part 14c. A distance d2 between a position A of the outer edge end portion 14b and a position C of the lower end portion 14d in a ring axial direction Y is within a range of 0.001 mm to 0.05 mm, and a contact width d1 of the outer edge end portion 14b in the ring axial direction Y is within a range of 0.01 mm to 0.3 mm.

The piston ring 1, having a Napier ring shape, according to the present invention is used as a second compression ring, and is a sliding member that is mounted in a piston ring groove formed in the peripheral surface of a piston (not illustrated), and moves up and down while sliding on an inside surface of the cylinder liner (not illustrated) in accordance with an up and down movement (same as reciprocating movement) of the piston.

According to this piston ring 1, the distance d2 between the position A of the outer edge end portion 14b and the position C of the lower end portion 14d in the ring axial direction Y is within the above-described range, and the contact width d1 of the outer edge end portion 14b in the ring axial direction Y is within the above-described range, making it possible to adjust a relationship between a contact pressure and an oil seal and achieve both lower fuel consumption and efficient combustion.

It should be noted that, in the present application, "top" and "bottom" mean both end directions of the peripheral surface 14 in the axial direction Y of the piston ring 1 (or a width direction of the peripheral surface 14), and refer to an upper side and a lower side of the peripheral surface 14 when FIGS. 1A and 1B are viewed in planar view. Further, "upper surface 11" and "lower surface 12" mean surfaces on both sides of the piston ring 1 in the axial direction Y, and respectively refer to a surface on an upper side and a surface on a lower side when FIGS. 1A and 1B are viewed in planar view. Further, "peripheral surface 14" and "inside surface 13" mean surfaces on both sides of the piston ring 1 in a radial direction X, and respectively refer to a sliding surface on a left side and a surface on a right side when FIGS. 1A and 1B are viewed in planar view. Further, in the Napier ring, a step-shaped notch part 15 having a gouged shape is provided on the lower side of the peripheral surface. Furthermore, as illustrated in FIG. 1B, a chamfering part 16 may be provided in a lower portion of the inside surface 13. "Axial direction" is a direction along a virtual central axis of the piston ring, and is an up-down direction in FIGS. 1A and 1B. "Radial direction" is a direction toward a virtual central axis of the piston ring, and is a left-right direction in FIGS. 1A and 1B.

Hereinafter, the components will be described.

<Outer Shape of Piston Ring>

The piston ring 1 is formed so that a peripheral surface shape thereof is a tapered face shape and a cross-sectional shape in the axial direction is a Napier ring. The cross-sectional shape, as illustrated in FIGS. 1A and 1B, is a tapered shape with the peripheral surface 14 that gradually projects outward from the upper surface 11 to the lower surface 12.

The peripheral surface 14, as illustrated in FIG. 2, is constituted by the outer edge end portion 14b that has a non-tapered shape and comes into sliding contact, as the peripheral sliding surface, with the cylinder liner serving as the mating material, the outer peripheral tapered part 14a formed at a predetermined taper angle α above the outer edge end portion 14b, the curved surface part 14c having a diameter that gradually decreases inward from the outer edge end portion 14b to the lower end in the axial direction, and the lower end portion 14d forming a section of the curved surface part 14c. The step-shaped notch part 15 is formed in a lower portion of the peripheral surface 14.

The outer peripheral tapered part 14a is formed at an inclination angle, which is the taper angle α of 0.5° to 4°, inclusive, preferably 1° to 3°, inclusive, to a vertical line L1 parallel to the axial direction Y of the piston ring 1. This outer peripheral tapered part 14a is formed continuously from the outer edge end portion 14b, at a position above the outer edge end portion 14b described below in the axial direction Y.

The outer edge end portion 14b is a section serving as a "contact width" that comes into sliding contact with the cylinder liner, which is the mating material, as the peripheral sliding surface, and is formed into a non-tapered shape. "Non-tapered shape" means that the taper angle α is 0° to the vertical line L1 parallel to the axial direction Y of the piston ring 1. In the present invention, the contact width of the outer edge end portion 14b in the ring axial direction, that is, the distance d1 between the lower limit position (coordinate position) A and an upper limit position (coordinate position) B of the outer edge end portion 14b (contact width of the outer edge end portion in the ring axial direction Y) is within a range of 0.01 mm to 0.3 mm. By setting the distance d1 within this range, it is possible to, in combination with a range of the distance d2 mentioned later, maintain a contact pressure on the cylinder liner and an oil scraping performance in moderate states. When the distance d1 is less than 0.01 mm, the contact width may be too small, resulting in insufficient followability with respect to the cylinder liner. On the other hand, when the distance d1 exceeds 0.3 mm, the contact pressure may become too low, deteriorating the oil scraping performance. It should be noted that, from the viewpoint of followability and oil scraping performance, a more preferable range is 0.05 to 0.3 mm.

The curved surface part 14c is a continuous section having a diameter that gradually decreases inward from the outer edge end portion 14b to the lower end (downward) in the axial direction Y.

The lower end portion 14d is a portion forming a section of the curved surface part 14c. In the present invention, the distance d2 between the lower limit position (coordinate position) A of the outer edge end portion 14b and the position (coordinate position) C of the lower end portion 14d in the ring axial direction Y is within a range of 0.001 mm to 0.05 mm. By setting the distance d2 within this range, it is possible to, in combination with the range of the above-described distance d1, maintain the contact pressure on the cylinder liner and the oil scraping performance in moderate states. When the distance d2 is less than 0.001 mm, a tip end has an acute-angled shape, and thus chipping may readily occur. On the other hand, when the distance d2 exceeds 0.05 mm, the oil scraping performance may deteriorate.

The notch part 15 is a section formed by cutting out a lower end section (downward section) of the peripheral surface 14, gouging inward in the radial direction (radial direction X). The notch part 15 thus gouged is constituted by a curved surface or flat surface 15a on the upper surface side and a vertical surface 15b on the radial direction side in the notch part 15. The curved surface or flat surface 15a is formed of a curved surface or flat surface smoothly continuous from the lower end portion 14d. The notch part 15 is formed in the lower portion of the peripheral surface 14, and therefore the outer edge end portion 14b, the curved surface part 14c, and the lower end portion 14d positioned on the outermost side of the peripheral surface 14 in the radial direction have a shape also called a nose part. It should be noted that the "curved surface or flat surface 15a on upper surface side" means that, while the surface is a curved surface in the examples of FIGS. 1A and 1B, FIG. 2, and FIGS. 3A and 3B, the surface may be a flat surface.

Given d3 as a distance between a position (coordinate position) D of the outer edge end portion 14b and a position (coordinate position) E of the lower end portion 14d in the ring radial direction X, preferably d2/d3 is within a range of 0.20 to 1.20. The outer edge end portion 14b is, as the peripheral sliding surface, a contact width that comes into sliding contact with the cylinder liner, which is the mating material, and maintains the oil scraping performance by the contact pressure during sliding on the cylinder liner. When the contact width d1 of the outer edge end portion 14b gradually expands within the range of 0.01 mm to 0.3 mm and approaches the upper limit (0.3 mm), the contact pressure decreases and the scraping performance based on the contact pressure tends to deteriorate. However, even if d1 gradually expands and the contact pressure decreases, by setting d2/d3 within the above-described range, it is possible to maintain the scraping performance without deterioration even when the contact pressure fluctuates. As a result, both lower fuel consumption and a reduction in lubricating oil consumption (LOC) can be achieved.

It should be noted that d3 is preferably within a range of 0.010 mm to 0.050 mm. By setting d3 within this range, it is possible to maintain the scraping performance without deterioration even when the contact pressure fluctuates.

As illustrated in FIG. 2, the curved surface or flat surface 15a on the upper surface side of the notch part 15 is formed at an angle θ of 15°±3°. This angle θ is an angle (also referred to as a "Napier angle") formed by a parallel line L2 (parallel line orthogonal to the above-described vertical line L1) extending from the lower end portion 14d in the ring radial direction X, and an initial inclination of the curved surface or flat surface 15a notched from the lower end portion 14d. The initial inclination is an inclination at a distance of about 0.2 mm to 0.5 mm from the lower end portion 14d of the notch part 15.

<Piston Ring Base Material>

As a piston ring base material 10, a carbon steel material, a low alloy steel material, or a spring steel material can be used. Further, other steel materials having characteristics similar to those of these steel materials can also be used. Specifically, examples of the carbon steel material include hard wire material, particularly SWRH62A and SWRH62B represented by JIS standards, and other steel materials having characteristics similar to those of these steel materials. Examples of the low alloy steel material include oil tempered wire for valve springs, particularly SWOSC-V represented by JIS standards, and other steel materials having characteristics similar to those of these steel materials. Examples of the spring steel material include particularly SUP9, SUP10, and SUP11 represented by JIS standards, and other steel materials having characteristics similar to those of these steel materials.

It should be noted that, in the present invention, a carbon steel material, a low alloy steel material, or a spring steel material containing at least C: 0.2 mass % to 1.0 mass %, inclusive, can be preferably used. Further, Cr may be contained within a range of 0.5 mass % to 1.1 mass %, inclusive. While such a piston ring base material 10 is mainly made of a carbon steel material containing iron and inevitable impurities, the piston ring base material may contain other elements, for example, elements such as Si and Mn, depending on the desired purpose, and other elements such as molybdenum (Mo), nickel (Ni), or vanadium (V) may be contained as necessary.

The piston ring base material 10 is preferably cleaned, as necessary, by an ion bombardment treatment before formation of a foundation film, a hard film, or the like described later, on the surface thereof. With this treatment, a passive film such as an oxide film or a hydroxide film present on the surface of the piston ring base material 10 can be destroyed, cleaning the surface. The ion bombardment treatment is performed by generating an arc discharge between a target for formation of a foundation film, a hard film, or the like and a cathode, and irradiating the surface of the piston ring base material 10 with ionized metal ions.

The piston ring base material 10 is preferably formed to a hardness within a range of Vickers hardness of HV 350 to HV 550, inclusive. With the Vickers hardness set within this range, a favorable function as a second compression ring can be exhibited even when a thermal load or a pressure load becomes large. When a film of physical vapor deposition (PVD) or diamond-like carbon (DLC) is to be applied, the piston ring is obtained by performing the ion bombardment treatment while maintaining a temperature at which the hardness of the piston ring base material 10 does not decrease. Accordingly, such a piston ring base material 10 does not decrease in hardness even by the ion bombardment treatment before formation of a hard film or the like, making it possible to obtain the piston ring 1 in which a hard film is formed on the piston ring base material 10 with favorable adhesion.

<Hard Treatment Layer>

Figure 3A:
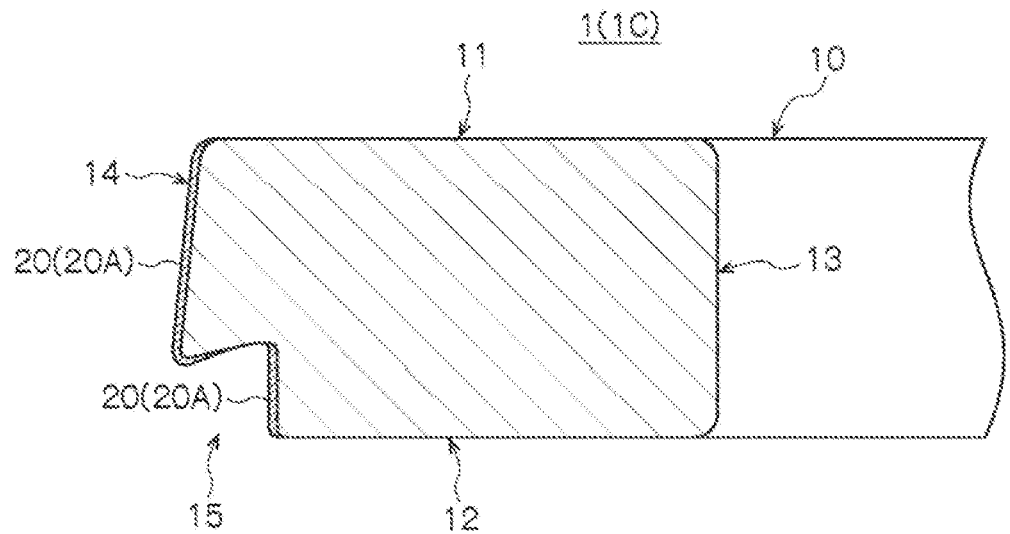
FIGS. 3A and 3B are cross-sectional configuration views illustrating another example of a piston ring, FIG. 3A being a form example in which a hard treatment layer is provided mainly on a peripheral surface.
Figure 3B:
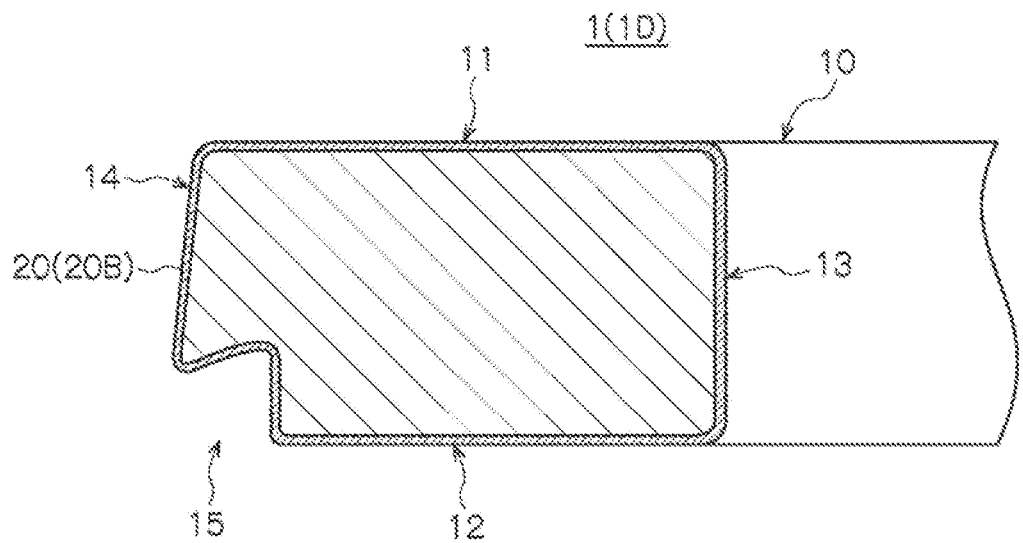

In the present invention, preferably a hard treatment layer 20 is provided on at least the peripheral surface 14 of the piston ring base material 10. The present invention is characterized by an outer shape of the piston ring 1 and, as illustrated in FIGS. 3A and 3B, the shape after the hard treatment layer 20, selected from a foundation film, a hard film, a hard carbon film, and the like described later, is provided as needed need only be the above-described characteristic shape. Therefore, it can be said that the piston ring 1 having the above-described characteristic outer shape is within the scope of the present invention, regardless of whether or not the hard treatment layer 20 is provided. Accordingly, even the piston ring 1 not provided with the hard treatment layer 20 is included in the scope of the present invention as long as the shape-related action is exhibited. The "hard treatment layer 20" here includes at least a hard film, and includes a foundation film and a hard carbon film as necessary.

(Foundation Film)

The foundation film is any film provided on the piston ring base material 10 as necessary. When a hard film is provided on the piston ring base material 10, the foundation film acts to enhance the adhesion thereof and prevent peeling. The foundation film may be provided at least in the area where the hard film is provided. Preferable examples of the foundation film include a Cr film, a Cr—B film, a Cr—B—V film, a Cr—B—V—Ti film, a Cr—B—V—Ti—Mn film, a Cr—B—V—Ti—Mo film, a Cr—B—V—Ti—Mn—Mo film, and the like. The foundation film can be formed by various forming means, and can be formed by film-forming means such as, for example, a sputtering method, a vacuum deposition method, and an ion plating method. A thickness of the foundation film is not particularly limited, but is, for example, about 0.5 μm to 2.0 μm, inclusive.

(Hard Film)

The hard film is preferably provided on the piston ring base material 10, but is not essential and can be provided as desired as necessary, as described above. The hard film, while not particularly limited, is preferably a chromium nitride-based film or a chromium plating film. Preferable examples of the chromium nitride-based film include any one of Cr—N film, a Cr—B—N film, a Cr—B—V—N film, a Cr—B—V—Ti—N film, a Cr—B—V—Ti—Mn—N film, a Cr—B—V—Ti—Mo—N film, a Cr—B—V—Ti—Mn—Mo—N film, or the like. These hard films can be formed by various methods, and can be formed by, for example, an ion plating method, a plating method, or the like. The hard film need only be provided on at least the peripheral surface 14, but may be provided on the upper surface 11, the lower surface 12, and the inside surface 13 in addition to the peripheral surface 14.

The hard film is preferably provided on the foundation film. By providing the hard film on the foundation film, it is possible to further improve the adhesion and suppress, to the extent possible, the peeling of the hard film under high contact pressure. As a result, the piston ring 1 can be imparted with high wear resistance and high scuffing resistance.

In the case of the chromium nitride-based film, the thickness is preferably within a range of 5 μm to 30 μm, inclusive, and more preferably within a range of 7 μm to 20 μm, inclusive. Further, the Vickers hardness is preferably within a range of HV 800 to HV 2300, inclusive, and more preferably within a range of HV 1000 to HV 2000, inclusive. Further, in the case of the chromium plating film, the thickness is preferably within a range of 5 μm to 50 μm, inclusive, and more preferably within a range of 5 μm to 30 μm, inclusive. Furthermore, the Vickers hardness is preferably within a range of HV 500 to HV 1000, inclusive, and more preferably within a range of HV 800 to HV 1000, inclusive.

(Hard Carbon Film)

The hard carbon film can be provided on the foundation film or on the hard film. The hard carbon film is a so-called diamond-like carbon film, which is an amorphous carbon film. With the hard carbon film formed on the hard film, the hard carbon film acts to reduce an initial friction of the piston ring 1. Such an action is based on the fact that the hard carbon film has a low coefficient of friction with respect to the inside surface of the cylinder liner, which is the mating material of the piston ring 1, and has favorable running-in property with the mating material. In particular, the above-described action can be exhibited by providing the hard carbon film on at least the outer edge end portion 14b of the piston ring 1. A surface roughness Ra (arithmetic average roughness Ra in JIS B0601-1994) after the hard carbon film is provided is preferably 0.1 μm or less, and more preferably 0.05 μm or less. By providing such a smooth hard carbon film, it is possible to further improve the initial friction at the outer edge end portion 14b of the piston ring 1 that slides on the inside surface of the cylinder liner.

As the hard carbon film, a film containing one or two or more of silicon, oxygen, hydrogen, nitrogen, and argon in addition to carbon serving as the main component can be preferably applied. The hard carbon film is preferably formed by an ion plating method similar to that of the hard film, but may be formed by various forming means such as a sputtering method and a chemical vapor deposition (CVD) method. A thickness of the hard carbon film, while not particularly limited, is, for example, preferably within a range of about 0.5 μm to 10 μm, inclusive.

(Manufacturing Method)

A method for manufacturing the piston ring 1 according to the present invention is not particularly limited. For example, first, the carbon steel material mentioned above is molded and polished (including buffing, lapping, and dry-honing as desired) to form the piston ring base material 10. Subsequently, the surface of the piston ring base material 10 is cleaned by ion bombardment treatment as necessary. Subsequently, the hard treatment layer 20 is formed as necessary. For example, the foundation film is formed on at least the peripheral surface 14 of the piston ring base material 10. Subsequently, a hard film such as a chromium nitride film or a chromium plating film is formed on the foundation film. Subsequently, the hard carbon film is formed as necessary. Lastly, buffing, lapping, and the like are performed as necessary to manufacture the piston ring 1.

EXAMPLES

Hereinafter, the present invention will be described in further detail with reference to examples and a comparative example.

Example 1

As the piston ring base material 10, the piston ring base material 10 having a Napier ring shape obtained by machining, into the outer diameter shape illustrated in FIGS. 1A and 1B, a hard steel wire composed of C: 0.63 mass %, Si: 0.25 mass %, Mn: 0.75 mass %, P: 0.01 mass %, S: 0.01 mass %, and a remnant of iron and inevitable impurities was prepared. The machining was performed by molding, buffing, and dry-honing. Next, a hard film made of Cr plating having a thickness of 25 μm was formed on the piston ring base material 10 by an electroplating method. Subsequently, buffing and lapping were performed to obtain the piston ring 1.

With regard to the final outer diameter shape of the piston ring 1 thus obtained, the outer peripheral tapered part 14a had a taper angle α of 2° to the vertical line L1 parallel to the axial direction Y of the piston ring 1. The contact width d1 of the outer edge end portion 14b in the ring axial direction (distance between the lower limit position A and the upper limit position B of the outer edge end portion 14b) was set to 0.2 mm. The distance d2 between the lower limit position (coordinate position in the Y direction) A of the outer edge end portion 14b and the position (coordinate position in the Y direction) C of the lower end portion 14d in the ring axial direction Y was set to 0.005 mm. The distance d3 between the position (coordinate position in the X direction) D of the outer edge end portion 14b and the position (coordinate position in the X direction) E of the lower end portion 14d in the ring radial direction X was set to 0.015 mm.

It should be noted that the cross section of the piston ring 1 was polished to measure the Vickers hardness. The Vickers hardness of the piston ring base material 10 was HV 454, and the Vickers hardness of the hard film was HV 900.

Examples 2 to 7

In Examples 2 to 7, other than the treatment layer (Cr plating) of the peripheral sliding surface of Example 1 being changed to the treatment layers of the types shown in Table 1, and d2 and d3 being changed to the values shown in Table 1, the piston rings of Examples 2 to 7 were fabricated in the same manner as in Example 1. Table 1 shows both the hardness and film thickness of the hard films.

The hydrogen-free DLC of Example 2 was a hard carbon film formed by an arc ion plating method in an argon gas atmosphere using a carbon target. The hydrogen content was 3 atom %. The Cr—N of Example 3 was a hard film made of chromium nitride obtained by setting the piston ring base material 10 in a chamber of an ion plating device, cleaning the surface by ion bombardment, and subsequently forming a Cr film having a thickness of 1.0 μm as the foundation film, and then formed by a PVD method (ion plating method) on the foundation film. The Cr plating of Example 4 was a hard film formed by an electroplating method. The hydrogen-free DLC of Example 5 was a hard film formed in the same manner as in Example 2. The Cr—N of Example 6 was a hard film formed in the same manner as in Example 3. The hard film of Example 7 was a laminated film obtained by first forming Cr—N similar to that of Example 3, and then forming the hydrogen-free DLC of Example 2 on the Cr—N.

Comparative Example 1

In Comparative Example 1, other than the treatment layer (Cr—N-based PVD) of the peripheral sliding surface of Example 3 being changed to the treatment layer of the type shown in Table 1, and d2 and d3 being changed to the values shown in Table 1, the piston ring of Comparative Example 1 was fabricated in the same manner as in Example 3. The Cr—N of Comparative Example 1 was a hard film made of chromium nitride formed by the PVD method (ion plating method). Table 1 shows both the hardness and film thickness of the hard film.

[Oil Consumption Test]

An oil consumption test was conducted using the piston rings obtained in Examples 1 to 7 and Comparative Example 1. In the oil consumption test, an actual machine test of an in-line four-cylinder gasoline engine with a displacement of 2.0 L was conducted. The operating conditions of the engine included a load factor of 100% and a rotation speed of 6000 rpm, and the LOC (oil consumption: g/hr) was measured by a continuous gravimetric method. Table 1 shows the relative ratios of the LOCs of Examples 1 to 7 as LOC ratios, given 100 as the LOC of Comparative Example 1.

The measurement was performed upon combining the first compression ring, the second compression ring, and the oil ring. As the first compression ring, the compression ring made of a SWOSC-V material and obtained by setting the width in the ring axial direction to 1.2 mm, setting the width in the ring radial direction to 2.9 mm, making the peripheral surface shape into a barrel face, and treating the peripheral surface by Cr—N-based PVD, was used. As the second compression ring, the piston rings obtained in Examples 1 to 7 and Comparative Example 1 were used. As the oil ring, a three-piece-type oil ring was used with the combined width in the axial direction of the side rail and the spacer expander set to 2.0 mm, and the combined width in the radial direction of the side rail and the spacer expander set to 2.5 mm. The side rail used was obtained by treating the peripheral surface of a SWRH72A material represented by the JIS standard by Cr—N-based PVD treatment, and the spacer expander used was a SUS304 material.

As understood from the results of Table 1, the piston rings 1 of Examples 1 to 7 within the range of the outer shape according to the present invention had a LOC ratio of less than 100, specifically 70 to 91, inclusive, and exhibited stable, low LOCs. From the results, it is understood that, because the distance d2 between the position A of the outer edge end portion 14b and the position C of the lower end portion 14d in the ring axial direction Y is within the above-described range, and the contact width d1 of the outer edge end portion 14b in the ring axial direction Y is within the above-described range, it is possible to adjust the relationship between the contact pressure and the oil seal and achieve both lower fuel consumption and a reduction in lubricating oil consumption (LOC). d1, although 0.20 mm in Examples 1 to 7, is preferably within the range of 0.01 mm to 0.3 mm. d2, although within the range of 0.005 mm to 0.045 mm in Examples 1 to 7, is preferably within the range of 0.001 mm to 0.050 mm. d3, although within the range of 0.015 mm to 0.050 mm in Examples 1 to 7, is preferably within the range of 0.010 mm to 0.050 mm. d2/d3, although 0.33 to 0.90 in Examples 1 to 7, is preferably within the range of 0.20 to 1.20, particularly within a range of 0.60 or greater and less than 1.00.

TABLE 1

| | | | | | Peripheral sliding surface | | | |
|---|---|---|---|---|---|---|---|---|
| | d1 (mm) | d2 (mm) | d3 (mm) | d2/d3 | Treatment layer | Hardness (HV) | Film thickness (μm) | LOC ratio |
| Example 1 | 0.2 | 0.005 | 0.015 | 0.33 | Cr plating | 900 | 25.0 | 70 |
| Example 2 | 0.2 | 0.010 | 0.023 | 0.43 | DLC | 1500 | 1.0 | 75 |
| Example 3 | 0.2 | 0.015 | 0.025 | 0.60 | Cr—N | 1400 | 10.0 | 77 |
| Example 4 | 0.2 | 0.020 | 0.027 | 0.74 | Cr plating | 900 | 25.0 | 80 |
| Example 5 | 0.2 | 0.025 | 0.036 | 0.69 | DLC | 1500 | 1.0 | 80 |
| Example 6 | 0.2 | 0.034 | 0.038 | 0.89 | Cr—N | 1400 | 10.0 | 87 |
| Example 7 | 0.2 | 0.045 | 0.050 | 0.90 | DLC on Cr—N | 1400: Cr—N 1500: DLC | 20.0: Cr—N 15.0: DLC | 91 |
| Comparative Example 1 | 0.2 | 0.055 | 0.060 | 0.92 | Cr—N | 900 | 10.0 | 100 |

DESCRIPTIONS OF REFERENCE NUMERALS 1, 1A, 1B, 1C, 1D Piston ring
10 Piston ring base material
11 Upper surface
12 Lower surface
13 Inside surface
14 Peripheral surface (Peripheral sliding surface)
14a Outer peripheral tapered part
14b Outer edge end portion (Nose part)
14c Curved surface part
14d Lower end portion
15 Step-shaped notch part
15a Curved surface or flat surface on upper surface side
15b Vertical surface on radial direction side
16 Chamfering part
20, 20A, 20B Hard treatment layer
α Taper angle
L1 Vertical line
L2 Parallel line orthogonal to vertical line L1
d1 Distance between A and B (Contact width of outer edge end portion in up-down direction)
d2 Distance between A and C (Distance from lower end portion to outer edge end portion in Y direction)
d3 Distance between D and E (Distance from outer edge end portion to lower end portion in X direction)
A Lower limit position of outer edge end portion (Coordinate position in Y direction)

B Upper limit position of outer edge end portion (Coordinate position in Y direction)
C Position of lower end portion (Coordinate position in Y direction)
D Position of outer edge end portion (Coordinate position in X direction)
E Position of lower end portion (Coordinate position in X direction)
X Ring radial direction
Y Ring axial direction (Up-down direction)
θ Angle of notch part

What is claimed is:

1. A piston ring for an internal combustion engine formed so as to have a tapered shape by a peripheral surface that gradually projects outward from a top to a bottom, and an axial cross-sectional shape of a Napier ring,
   the peripheral surface being constituted by
   an outer edge end portion that has a non-tapered shape and comes into sliding contact, as a peripheral sliding surface, with a mating material,
   an outer peripheral tapered part formed at a predetermined taper angle above the outer edge end portion,
   a curved surface part having a diameter that gradually decreases inward from the outer edge end portion to a lower end in an axial direction, and
   a lower end portion forming a section of the curved surface part,
   a distance (d2) between a lower limit position of the outer edge end portion and a position of the lower end portion in a ring axial direction being within a range of 0.001 mm to 0.05 mm, and
   a contact width (d1) of the outer edge end portion in the ring axial direction being within a range of 0.01 mm to 0.3 mm,
   the distance (d3) between the position of the outer edge end portion and the position of the lower end portion in the ring radial direction is within a range of 0.015 mm to 0.050 mm, and
   d2/d3 is within a range of 0.20 to 1.20, where d3 is a distance between a position of the outer edge end portion and a position of the lower end portion in a ring radial direction.

2. The piston ring according to claim 1, wherein
   at least the peripheral surface includes a hard treatment layer.

3. The piston ring according to claim 2, wherein
   the hard treatment layer is a chromium nitride-based film, a chromium plating film, a hard carbon film, or a laminated film with a hard carbon film provided on a chromium nitride-based film.

4. The piston ring according to claim 1, wherein
   the hard treatment layer is a hydrogen-free hard carbon film formed by an arc ion plating method, wherein a thickness of the hard carbon film is within a range of about 0.5 μm to 10 μm.

5. The piston ring according to claim 1, wherein
   the curved surface part comprises an angle of 15°±3° between a parallel line extending from the lower end portion in the ring radial direction and an initial inclination of the curved surface notched from the lower end portion, the initial inclination being 0.2 mm to 0.5 mm from the lower end portion.

* * * * *